United States Patent [19]

Leimala et al.

[11] 4,125,587
[45] Nov. 14, 1978

[54] REMOVING ZINC FROM A NICKEL SOLUTION BY EXTRACTION

[75] Inventors: Raimo J. Leimala; Matti Seilo, both of Harjavalta, Finland

[73] Assignee: Outukumpu OY, Finland

[21] Appl. No.: 841,286

[22] Filed: Oct. 12, 1977

[30] Foreign Application Priority Data

Oct. 12, 1976 [FI] Finland .................................. 762910

[51] Int. Cl.² .............................................. C01G 53/00
[52] U.S. Cl. ..................................... 423/139; 423/100; 423/140; 204/112
[58] Field of Search ............... 423/100, 139, 140, 147; 75/101 BE

[56] References Cited

U.S. PATENT DOCUMENTS

| | | | |
|---|---|---|---|
| 3,966,569 | 6/1976 | Reinhardt et al. | 75/101 BE |
| 4,011,297 | 3/1977 | Nyman et al. | 423/100 |

OTHER PUBLICATIONS

Ritcey, G. et al., "Some Comments on the Loss, and Environmental Effects of Solvent Extraction Reagents Used in Metallurgical Processing," in *Solvent Extraction*, I.S.E.C., 1974, vol. III, Soc. Chem. Industry, London, 1974, pp. 2873–2875.

*Primary Examiner*—Brian Hearn

[57] ABSTRACT

A process for removing zinc from an aqueous solution of a nickel salt by liquid-liquid extraction using as the extraction agent an organic phosphoric acid dissolved in an organic solvent, adding a strongly oxidizing substance at an elevated temperature to the aqueous phase emerging from the extraction to precipitate the cobalt as a hydroxide and decompose the organic phase left in the aqueous phase and to adsorb it into the cobalt hydroxide precipitate, and finally separating it from the pure aqueous nickel salt solution.

5 Claims, 1 Drawing Figure

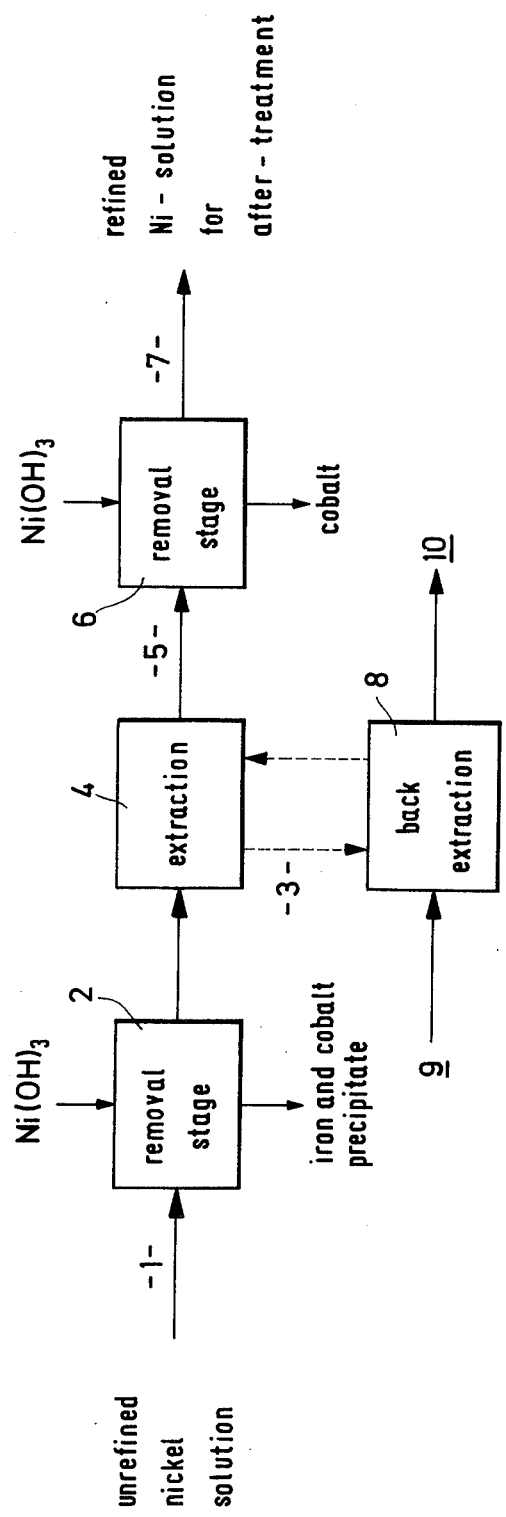

REMOVING ZINC FROM A NICKEL SOLUTION BY EXTRACTION

BACKGROUND OF THE INVENTION

Little attention has so far been accorded to the removal of zinc in connection with nickel production. On one hand, raw materials which contain only small concentrations of zinc have been used; furthermore, being easily volatile it has generally been removed to a sufficient degree during the pyrometallurgical treatment stages. On the other hand, because of this great demands have not been set regarding the zinc content in the nickel produced.

In recent years, however, increasing purity demands have been set on nickel products, also in regard to zinc. At the same time raw materials which contain increasing quantities of impurities have been taken into use. Furthermore, as the production of nickel in certain cases is performed entirely without the pyrometallurgical stage, zinc removal has drastically gained in importance.

Only a few processes for zinc removal are known in connection with the hydrometallurgical treatment of nickel. The most common method is to remove zinc in the form of a sulfide by using hydrogen sulfide. The disadvantages of this process are: poisonous nature of hydrogen sulfide and the difficulty of obtaining a sufficiently zinc-free solution without considerable nickel losses into the produced sulfide precipitate.

In principle, two types of processes have been introduced in patent literature for the extraction of zinc from nickel solutions. The first group comprises processes which require the presence of a certain anion, mainly chloride, iodide, thiocyanate, etc., in which case the zinc can be extracted by means of extraction agents of the anion-exchanger type, such as amines (U.S. Pat. Nos. 3,446,720 and 3,194,652) or sulfonium thiocyanate (British Pat. No. 1,314,924). The second group consists of processes in which the zinc is extracted by means of extraction agents of the cation-exchanger type, such as di-(2-ethyl-hexyl) phosphoric acid (U.S. Pat. Nos. 3,666,446 and 2,992,894) or salicylic aldoximes (German Offenlegungsschrift No. 2,334,901).

The object of the present invention is to provide a process for removing zinc by extraction in connection with the hydrometallurgical production of nickel. The nickel solution from which zinc is removed is usually prepared by leaching ore, concentrates, intermediate products obtained by pyro- or hydrometallurgical processes, or nickel-bearing scrap metal.

The object of the invention is specifically to provide a process by which the problems connected with the use of organic phosphoric acids in zinc extraction can be eliminated. Organic phosphoric acid here denotes compounds with the following general formula

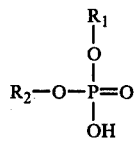

in which $R_1$ and/or $R_2$ are alkyl, aryl, or alkyl-aryl radicals, mutually either similar or different, in which case only one of them can be hydrogen. This extraction agent is dissolved in an organic solvent, usually a hydrocarbon or a hydrocarbon mixture, especially light petroleum (kerosene). This organic solution can also contain such additives as alcohols or tributyl phosphate.

One of the greatest drawbacks of such extraction processes is that some of the organic solution is always left in the refined solution obtained, part of it actually dissolved in the obtained aqueous solution, and part of it in the form of small, unseparated microdroplets. This loss of organic material is a substantial cost factor, and in addition it may, specifically in nickel processes, affect the quality of the final product. It has been noticed that, if the last stage of nickel production consists of an electrolytic reduction of nickel, even small quantities of the extraction agent or of the hydrocarbon used as a solvent, worsen the appearance of the cathodes. When hydrogen reduction is used for the production of nickel, the said organic substances may increase the carbon contents in the nickel.

Several processes are currently in use for the removal of organic substances from the aqueous solutions of extraction. The quantity of the organic solution loss can be decreased with the aid of different coalescers or by froth flotation. The same can be achieved by using specially-constructed settling devices or a centrifuge for the separation of the different phases of the dispersion produced by extraction. Activated carbon filtration has been noted to be an effective remover or organic droplets. All these processes are, however, expensive in regard to both investment and operation. By the process according to the present invention the use of separate additional devices can be eliminated.

SUMMARY OF THE INVENTION

According to the invention, nickel solution is purified by the following procedure: Zinc extraction is followed by a cobalt removal stage, known per se, during which the cobalt is precipitated, in the form of a trivalent hydroxide, by oxidizing the bivalent cobalt present in the solution into a trivalent form with the aid of a strong oxidizing agent, such as chlorine, hypochlorite, trivalent and/or tetravalent nickel hydroxide, etc. Thereby the drastic oxidation, the elevated temperature used in the oxidation, and the filtration stage with high adsorption capacity cause an effective removal of the organic material.

The details of the zinc extraction can be selected from among several alternatives, depending, among other things, on the concentration of the zinc to be extracted. When extracting low zinc concentrations, the process can be carried out simply by mixing together the extraction solution and the aqueous solution from which the zinc is to be removed, provided that the pH of the latter solution is not too low. When extracting higher zinc concentrations, the procedure according to, e.g., British Pat. No. 1,429,269 can be used; salt forms of the extracting agent can also be used.

The cobalt removal of the above type is often more effective if it is performed in two stages. In that case it is advantageous to place the extraction of zinc between these two cobalt removal stages, if the solution entering these treatment stages contains iron, because iron combines very readily, in a trivalent form, with organic phosphoric acids, and it is usually not released from them during a normal regeneration stage, but its removal requires a separate treatment.

DESCRIPTION OF THE DRAWING AND A PREFERRED EMBODIMENT OF THE INVENTION

The invention is described below in more detail with reference to the following example and with reference to the enclosed drawing, which depicts a schematic flow diagram of a preferred embodiment of the invention.

EXAMPLE

The feed solution 1 was a nickel-bearing solution which had been obtained by leaching a nickel-bearing intermediate product. This solution contained nickel 95 g/l, and in addition, zinc 980 mg/l, cobalt 560 mg/l, and iron 12 mg/l. Number 2 indicates the first stage of cobalt removal, during which the cobalt concentration in the solution was lowered at 80° C to 100 mg/l by adding $Ni(OH)_3$ at a rate of 1100 g/l, and at the same time iron precipitated to a concentration below 1 mg/l. During the stage 4 the zinc was extracted at 60° C by using, as an extraction agent, di-(2-ethyl-hexyl) phosphoric acid dissolved in a hydrocarbon product which goes under the trade name of Shellsok K at a volume ratio of 1:9. By using a three-stage apparatus of the mixer-settler type and the extraction process according to British Pat. No. 1,429,269, a refined product 5 was obtained, with a zinc concentration of 1 mg/l. This solution has an organic material content of 560 m/l. The refined product 5 from the extraction was thereafter pumped to the second cobalt removal stage 6, during which the cobalt concentration in the solution was lowered at 80° C to 8.5 mg/l by adding $Ni(OH)_3$ at a rate of 400 g/l. After the second cobalt removal stage 6, the solution 7 was pumped to nickel electrolysis. At this stage the concentration of organic material in the solution was 11 mg/l, and no worsening of the outer appearance of the cathodes caused by it could be observed.

The zinc-bearing organic solution 3 obtained from the zinc extraction was regenerated in a two-stage apparatus 8 by using a sulfuric acid solution 9 with a sulfuric acid concentration of 100 g/l. The obtained acid zinc sulfate solution 10 can be treated by a known process for the recovery of the zinc present in it.

Out of the total nickel quantity, 0.01 % passed into this solution 10.

The cobalt removal stage used in the present invention is known per se and has been described in the Outokumpu News, No. 2 (1973) pp. 8-10. It was, however, surprising that in this connection it also efficiently removed the detrimental organic material from the solution emerging from the extraction.

Although only $Ni(OH)_3$ is used as the oxidizing agent in the example at the cobalt removal stage 6 following the extraction, it is evident that any other substance which has a stronger oxidizing effect than air has a similar effect, i.e., it effectively decomposes organic material from the solution. The elevated temperature evaporates hydrocarbons, and the drastic oxidation decomposes the organic extraction agent and its solvent into compounds which the produced cobalt hydroxide precipitate adsorbs efficiently, whereby these organic compounds are removed from the solution together with the cobalt precipitate and the obtained product is a pure aqueous nickel solution suitable for further processing.

It is also evident that the drastic oxidation and the high temperature, as well as the separation of the hydroxide precipitate, have an effect similar to that illustrated in the above example on other organic extraction agents and their solvents.

The reaction velocity of the cobalt removal stage is dependent on the temperature, and it has been observed that it is not profitable to operate below 60° C. In addition, the evaporation of hydrocarbons is more effective at a higher temperature, although it is not worth while to surpass the boiling point of the solution because of the pressure vessels necessary in that case. It is advantageous to operate at 80° C, at which the reaction velocity is sufficient, the hydrocarbons evaporate relatively easily, and the solution does not require very much heating.

The extraction of zinc is performed advantageously by using the automatic pH control described in British Pat. No. 1,429,269.

What is claimed is:

1. A process for removing zinc from an aqueous solution of a nickel salt containing cobalt by liquid-liquid extraction, comprising:
   first adding a strongly oxidizing agent to the aqueous solution at an elevated temperature in order to precipitate part of the cobalt as Co(III) hydroxide;
   then extracting zinc using an organic extraction agent and solvent from the aqueous solution of the nickel salt;
   thereafter separating the aqueous phase from the organic phase; and
   finally precipitating further cobalt from the aqueous phase at an elevated temperature and in the presence of a strongly oxidizing agent as a hydroxide thereby decomposing the organic phase left in the aqueous phase and absorbing it into the precipitate.

2. A process according to claim 1, in which the strongly oxidizing agent used is chlorine, hypochlorite, or nickel (III) and/or nickel (IV) hydroxide.

3. A process according to claim 1, in which the cobalt is precipitated as a hydroxide at a temperature which is at least 60° C and up to the boiling point of the solution.

4. A process according to claim 1, in which the extraction agent used is di-(2-ethyl-hexyl) phosphoric acid dissolved in an organic solvent.

5. A process according to claim 1, in which the zinc extraction is performed by using automatic pH control.

* * * * *